Aug. 14, 1956 L. A. MEACHAM 2,759,047

PULSE TRANSMISSION SYSTEM AND REGENERATIVE REPEATER THEREFOR

Filed Dec. 27, 1950 3 Sheets-Sheet 1

INVENTOR
L. A. MEACHAM
BY Harry C. Hart
ATTORNEY

INVENTOR
L. A. MEACHAM
BY Harry C. Hart
ATTORNEY

INVENTOR
L. A. MEACHAM
BY Harry C. Hart
ATTORNEY

United States Patent Office 2,759,047

Patented Aug. 14, 1956

2,759,047

PULSE TRANSMISSION SYSTEM AND REGENERATIVE REPEATER THEREFOR

Larned A. Meacham, New Providence, N. J., assignor to Bell Telephone Laboratories, Incorporated, New York, N. Y., a corporation of New York Application December 27, 1950, Serial No. 202,866

20 Claims. (Cl. 178—43.5)

This invention relates to systems for the transmission of information by pulse code techniques and particularly to regenerative amplifiers for such systems.

The principal object of the invention is to simplify and economize transmission apparatus.

A related object is to eliminate or reduce the tendency of the center line of a pulse train to wander or drift in potential.

Another related object is to reduce the low frequency band width required of a pulse transmission system.

Other objects will appear from the description which follows.

It is well known that one of the outstanding advantages of transmission by pulse code is that the pulse train may be regenerated at a repeater station before the pulses shall have been degraded by noise or apparatus defects to a point such that they cannot be reliably decoded. After such regeneration, the pulses are clean and sharp in outline. Such regeneration can be carried out successively at each of a number of repeater points between a transmitter station and the receiver station.

However, to carry out such regeneration of a conventional binary code pulse train of On pulses and Off pulses or spaces, it is desirable that the current or voltage amplitudes which represent the pulses and spaces remain at fixed values and be, for each such pulse or space, independent of the preceding sequence of pulses or spaces. In other words, the voltage or current representing any pulse sequence must not sag toward the base line, i. e., toward the average voltage or current. Where transmission is by carrier, this presents no serious problems; but when the code pulse train is transmitted without modulation, this requires that all low frequency components be accurately preserved. Otherwise, when an unbroken sequence of On pulses occurs, the center line drifts in one direction; and, contrariwise, when an unbroken sequence of Off pulses or spaces occurs, the center line drifts in the opposite direction. Such drift of the center line endangers the accuracy of recognition of pulses and spaces, particularly in the presence of noise or other interference. To reduce the rate of drift to such a point that transmission is reasonably secure, time constants of coupling elements must be very long; and if transformers are employed, they must have such broad frequency pass bands as to make them excessively bulky and too costly for closely spaced repeaters. Special apparatus of the character known as "D.-C. restorers" may be introduced to prevent the drift of the center line, but only at a substantial sacrifice of simplicity of the apparatus.

In accordance with the invention in one of its aspects, this drift of the center line of the pulse train is eliminated by the generation of a special derived pulse train which is inherently free of any such center line drift. This derived pulse train, which may be designated "twinned binary," is generated by delaying or storing the original pulse train for precisely one single pulse interval, inverting its polarity, and adding the result to the original pulse train. In other words, from the original pulse train there is subtracted a delayed replica of itself. The derived twinned binary code pulse train is characterized by three pulse values, namely, positive, negative, and zero. Each positive pulse represents a change from space to pulse in the original binary code, and each negative pulse represents a change from pulse to space in the original binary code, while a zero always represents a repetition of the preceding code element in the original binary code. No ambiguity exists, and therefore the original binary code may be uniquely reconstituted from the derived code at the receiver before decoding. This reconstitution is conveniently carried out by inverting the process of generating it. Thus, abstractly, instead of delaying the original pulse train and subtracting, the restoration process is carried out by delaying the recovered pulse train and adding. As a practical matter, this process may be actualized by the inclusion of a one pulse-period storage unit in the feedback path of an amplifier. A convenient instrumentality which embodies all necessary gain, feedback, and storage for the purpose is a bistable multivibrator.

An outstanding characteristic of the derived pulse train is that no two positive pulses ever occur in succession, and no two negative pulses ever occur in succession. Following every positive pulse there may be any number of spaces, but there is always one and only one negative pulse before occurrence of the next positive pulse, and the same holds true for each negative pulse. Thus, the algebraic average of the pulse amplitudes over any period which contains more than a few pulses is substantially zero so that there is no tendency for the center line to drift.

Now that the wander of the center line has been removed from the pulse train, it becomes possible to provide simplified pulse repeaters. Such repeaters take advantage of the ternary character of the derived train by a push-pull feature and take advantage at the same time of that characteristic of the derived pulse train by which the pulses, apart from degradation, always occur at definitely prescribed times to maintain a resonant circuit in a state of oscillation at the correct frequency and in the correct phase for opening a gate only during the brief interval in which a pulse, if present, is due to have substantially maximum value, keeping it closed at all other times. Whenever a pulse is passed by the gate, it reappears in the output circuit as a pulse of standardized amplitude, regardless of expected variations in the amplitude of the applied pulse. Thus, the incoming pulses are regenerated in amplitude; and, by virtue of the fact that the gate is opened only at the correct instant, each of these pulses is also regenerated in timing, that is to say, in its instant of occurrence. As a result, substantially complete regeneration is achieved in a comparatively simple fashion.

The invention will be more fully apprehended from the following detailed description of preferred embodiments thereof taken in connection with the appended drawings, in which.

Figure 1:
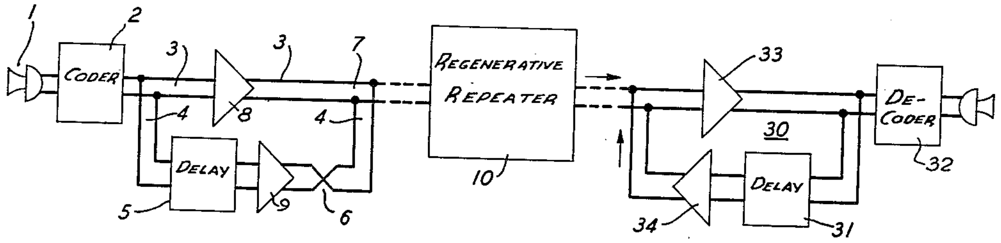
Fig. 1 is a schematic block diagram showing a telephone system embodying the invention.

Referring now to the figures, Fig. 1 shows a system embodying the invention. Here, a signal to be transmitted, for example, a voice wave, is converted into an electrical version by a microphone 1, and this electrical wave is then converted into a train of On or Off pulses arranged in the binary permutation code by a coder 2. The coder may be of any desired variety, a suitable one being described by R. W. Sears in the Bell System Technical Journal for January 1948, vol. 27, at page 44.

Figure 2:
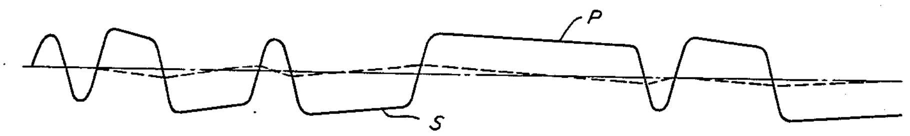
Fig. 2 is a wave-form diagram illustrating defects of prior systems.

When the sharp discontinuities and edges of such a code pulse train have been smoothed to substantially sinusoidal form, either by degradation in the course of transmission or by deliberate shaping beforehand, they may appear as shown in Fig. 2, where it is seen that any number of pulses or of spaces may occur in unbroken sequence in dependence on the message being coded; and when they do so occur, they may coalesce and appear as a single broad-topped pulse or a single broad-bottomed space, as shown, for example, at $p$ and $s$ of this curve. Because of this, the center of gravity of the pulse sequence taken over a short time may depart substantially from the horizontal axis, as shown by the broken line in Fig. 2, and the broad tops and bottoms tend to sag toward the base line. As indicated above, this condition makes for difficulties in regeneration, pulse recognition, and decoding.

Figure 3:
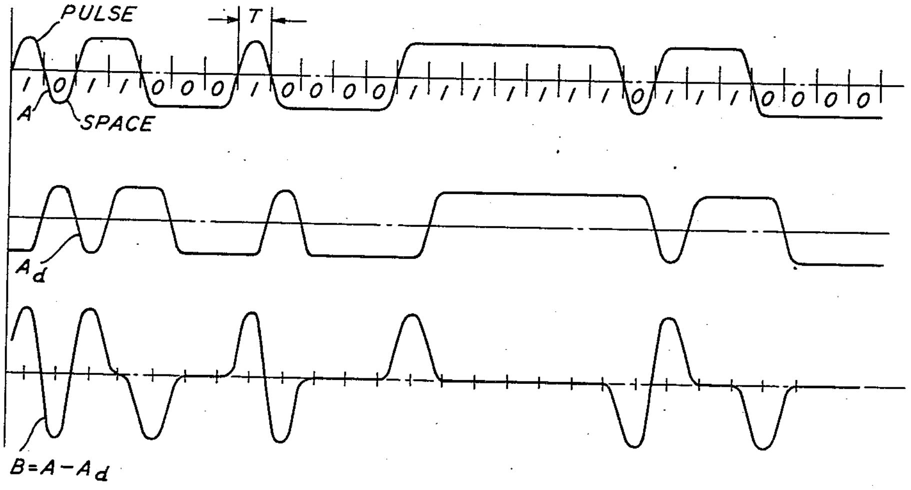
Fig. 3 is a group of wave-form diagrams of assistance in explaining the operation of the invention.

In accordance with the invention, therefore, the conventional binary code pulse train generated by the coder and shown in curve A of Fig. 3 is first converted into a twinned binary code pulse train. To effect this conversion, the binary code pulse train may be passed through two paths 3, 4 in parallel, one of which includes a single pulse-period storage or delay device 5, while one or the other of the two paths 3, 4 also provides, as by crossed leads 6, a reversal of polarity. Buffers 8, 9, are included in the two paths to prevent energy transfer in the undesired direction. The outputs of the two paths are then added, as at 7, Fig. 1. The mechanism of this process is illustrated in the curves A, $A_d$, and B of Fig. 3, where the curve $A_d$ is the same as the curve A but delayed by a single pulse period, while the curve B is the difference between the curves A and $A_d$.

Examination of the curve B shows that it is a three-valued or ternary pulse train having values positive, zero, or negative. In what follows, these values will sometimes be referred to as $On^+$, $On^-$, and Off. It will be observed that in the curve B, no two $On^+$ pulses ever occur in adjacent pulse positions, and likewise no two $On^-$ pulses ever occur in adjacent pulse positions, the only values which occur in immediate sequence being zero values or Off pulses. These occur in long sequences corresponding to long unbroken sequences of pulses or of spaces in the original binary code pulse train. During such repeated zero values, there is, of course, no tendency for the center line to drift because it is identical with the base line. Therefore, an average of the amplitudes of the pulse train B taken over any time which includes more than a very few pulses is substantially zero (and, indeed, such an average taken over any even number of pulses is precisely zero), so that all tendency of the center line to drift has been substantially eliminated.

Furthermore, an $On^+$ pulse of train B always represents a pulse of train A; an $On^-$ pulse of B always represents a space of A; a zero value or Off pulse of D may represent either a pulse or a space of A, depending upon whether the last preceding pulse of B was an $On^+$ or an $On^-$ pulse. From the foregoing, it appears that the train B is in effect a representation of the changes in the train A, $On^+$ pulses representing positive changes, i. e., from space to pulse, $On^-$ pulses representing negative changes, i. e., from pulse to space, and Off pulses or zero values representing no change, i. e., a sequence of pulses or spaces.

Figure 4:
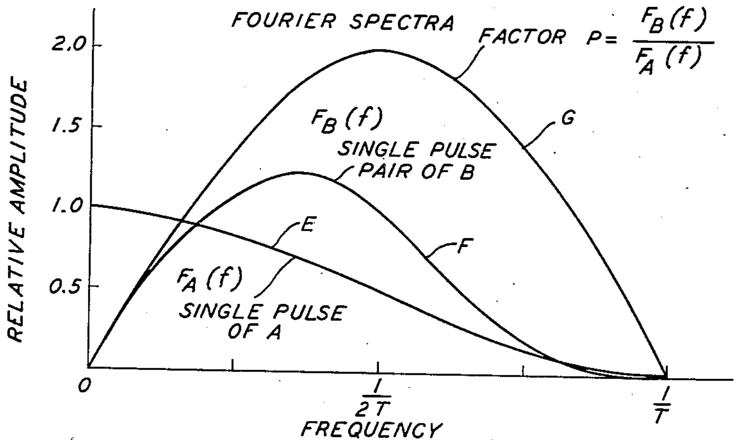
Fig. 4 is a group of pulse frequency spectra.

In addition, and by virtue of the fact that the center of gravity of the pulse train B is substantially on the zero axis, the band width required for transmission of the pulse train D is altered, and in particular it is reduced at the critical low frequencies as compared with the band width required for transmission of the pulse train B. In Fig. 4, there is plotted in the curve E the Fourier spectrum of the harmonic components of a single pulse of the original train A, and in curve F, the corresponding spectrum of a single pulse pair of the twinned binary train, i. e., the pulse pair derived from the single binary pulse. It will be observed that while the energy required by the curve F is greater at frequencies in the neighborhood of the reciprocal of twice the pulse period, it reduces to zero at zero frequency. It can indeed be shown that the magnitudes of the various frequency components of the curve B are equal to those of the curve A modified by the factor $$P=2 \sin \pi f T$$

where $f$ is the frequency of the component in question, and T is the pulse period. This factor P is plotted as the curve G of Fig. 4. Thus, the lower the frequency of a component below the middle of the band, the more completely is it cancelled out of the signal by the twinning process.

This twinned binary code pulse train lends itself readily to regeneration by a simplified non-linear pulse repeater, schematically indicated at 10 in Fig. 1. Such a repeater may take various forms, a particularly simple one being illustrated in Fig. 5. Here, a pair of pentode tubes $V_1$, $V_2$ are provided with their cathodes connected together, a push-pull output circuit including a center-tapped transformer $T_2$ interconnecting their anodes, and a push-pull input circuit including a center-tapped transformer $T_1$ interconnecting their control grids. The incoming train of pulses to be regenerated is applied by way of the input transformer $T_1$ to these two control grids. At the same time, a low loss or "high-Q" resonant circuit 14 comprising, for example, an inductance element L, connected in parallel with two series condensers $C_1$ and $C_2$, interconnects the mid-tap 15 of the secondary winding of the input transformer $T_1$ with suitably disposed electrodes of the two tubes, for example, their suppressor grids. A tap on the tuned circuit, here represented by the common terminal 16 of the condensers $C_1$ and $C_2$, is connected to the two cathodes and to the negative terminal of the anode supply source 17 and also, by way of a biasing resistor R, to the mid-tap 15 of the transformer $T_1$. The screen grids are connected in well-known fashion to a suitably chosen point of high potential, here illustrated for simplicity as the positive terminal of the anode current supply source 17. The high-Q resonant circuit is tuned to the basic pulse repetition frequency $$\left(f=\frac{1}{T}\right)$$

at which, it will be noted from Fig. 4, the incoming pulse train contains little or no energy. However, the well-known non-linearity of the control grid current-voltage characteristic of each tube causes harmonic energy to be produced and to energize the tuned circuit 14. When a positive pulse, for example, is applied to the input transformer $T_1$ and drives the control grid of the upper tube $V_1$ positive, a brief spurt of current flows to this grid. Similarly when a negative pulse is applied to the input transformer $T_1$ driving the control grid of the lower tube $V_2$ positive, a brief spurt of current flows to that grid.

Each of these current spurts flows from the tube cathode through the condenser $C_1$ and through the biasing resistor R, in parallel, thus automatically applying substantial negative biases of like magnitudes to the two control grids. These biases are maintained over a period which is long compared with a pulse code group by proportioning the resistor R and the condenser $C_1$ in well-known fashion. At the same time, each such current spurt operates to shock-excite the tuned circuit 14 and to maintain it in oscillation at its natural frequency. The opposite end of the tuned circuit 14 is connected to the suppressor grids of the two tubes. Because the tuned circuit is returned to the cathodes at an intermediate point 16, it effectively rocks in potential about this point, the suppressor grid potentials rising as the mid-point 15 of the push-pull input transformer secondary winding is driven negative by the grid current spurts. Thus, the potentials of the suppressor grids are elevated into the range of normal tube gain and depressed well below it in alternation and at the frequency of the basic pulse repetition rate and in synchronism and in phase with it. Each time a pulse of the incoming train is due to appear and to carry one or the other of the two control grids positive, the elevated suppressor grid potential gives the tubes maximum gain so that when the incoming pulse does appear, one or the other of these tubes delivers a substantial pulse to the output circuit by way of the output transformer $T_2$. However, should an unwanted or spurious pulse due to noise or other interference appear on the incoming line at an instant when no code pulse is due to appear, it is unable to pass through either of the tubes because, at this instant, the potentials of the suppressor grids, as governed by the resonant circuit 14 to which they are connected, are depressed to such a point that the unwanted incoming pulse is unable to cause the anode of either of the tubes to conduct. The automatic bias of the control grids holds them far enough negative so that spurious signals such as noise or interference having an amplitude substantially smaller than a normal pulse do not carry either grid above cut-off and, therefore, cannot give rise to any output current. The impedance of the primary winding of the transformer $T_2$ in the anode circuit may readily be made high enough so that input pulses substantially larger than normal tend to produce plate-voltage saturation.

Figure 7:
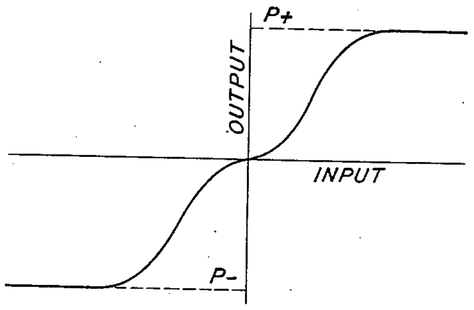
Fig. 7 is an input-output characteristic for a repeater according to the invention.
Figure 8:
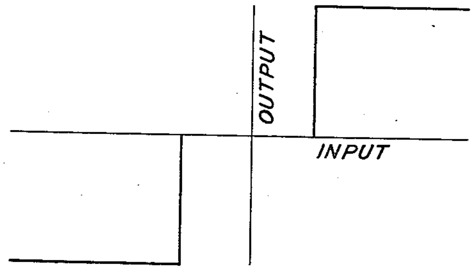
Fig. 8 is the corresponding curve for a number of such repeaters in tandem.

When the suppressors are at their most positive potential, the combined actions of the control grid and the plate of each of the tubes, as described above, gives rise to an input-output characteristic as shown in Fig. 7, where the the gain of the tube, i. e., the instantaneous output for a given input, is greatest for signals of intermediate value, being less both for smaller signals and for greater signals. Such a characteristic represents the tendency to equalize the output pulses at magnitudes corresponding to the most nearly horizontal portions of the characteristic. Since the tubes may be alike and are connected in push-pull, the characteristic of the repeater as a whole is as shown in the figure so that positive output pulses tend to be standardized at the magnitudes shown on the ordinate of the curve by the point $p^+$ and negative amplitudes at the equal and opposite point shown as $p^-$. When a number of such repeaters are coupled together in tandem with their absolute values of gain suitably matched to the attenuations in the transmission paths between them, the foregoing effects are cumulative so that the characteristic for all the repeaters taken together is a substantially square-cornered characteristic, as shown in Fig. 8.

Figure 5:
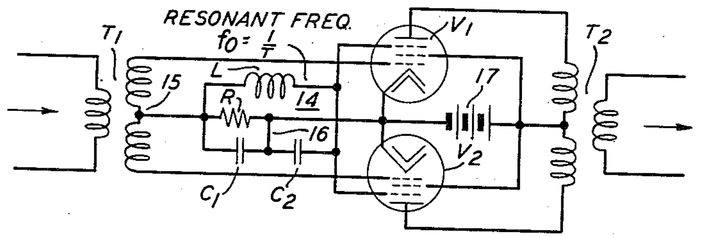
Fig. 5 is a schematic circuit diagram showing a push-pull regenerative pulse repeater.
Figure 6:
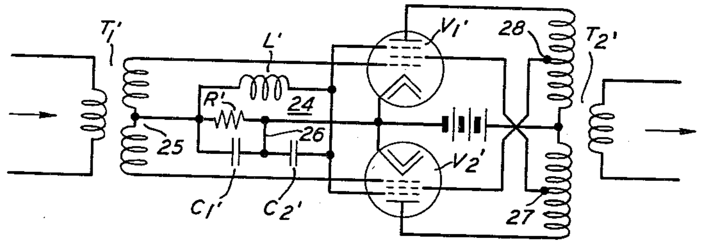
Fig. 6 is a schematic circuit diagram showing an alternative to the repeater of Fig. 5.

Fig. 6. shows a modification of the repeater of Fig. 5 in which, as before, the tubes $V_1'$, $V_2'$ are pentodes, the output circuit interconnecting their anodes includes a push-pull transformer $T_2'$, and the input circuit interconnecting their control grids includes a push-pull transformer $T_1'$, while a high-Q resonant circuit 24, which may be similar to the one described in connection with Fig. 5, is connected between the center tap 25 of the input transformer $T_1$ and the suppressor grids of the two tubes. In addition, the screen grids instead of being returned to a point of steady potential are now cross-connected to appropriate points 27, 28 of the output transformer $T_2'$ to provide positive feedback. With this arrangement, the gain of the repeater is augmented, and there results also a further standardization of amplitudes under joint control of both the control grid and the suppressor grid of each of the tubes. The action may be described as follows. When the suppressor grid of any pentode tube is at the same potential as its cathode, its anode current is normally several times as great as its screen grid current. As the suppressor grid is carried to more negative potentials, a greater fraction of the total cathode current passes to the screen and a smaller fraction to the anode. When the potential of the suppressor grid in the upper pentode $V_1'$ of Fig. 6, for example, is carried negative to a point such that the screen current and the anode current are alike in magnitude, their effects cancel in the output transformer, assuming each screen to be connected directly to the opposite plate. Similar cancellation can be achieved for values of screen currents which are not exactly equal to the anode currents by appropriate location of the screen taps 27, 28 on the output transformer winding, as shown in the figure. In either case, zero output voltage results.

It is further to be noted that when the control grid and the suppressor grid are both sufficiently positive to furnish a normal amount of mutual conductance $$\left(\frac{\partial i_p}{\partial v_{sc}}\right)$$

from screen to anode, then any positive increment of screen voltage causes an increase in total cathode current, the greater part of which flows to the anode, causing the anode potential to fall and the screen potential to rise (by virtue of the mutual inductance of the transformer), and thus reenforcing the original increment. Proper proportioning of the impedances involved, including the selection of the screen tapping points on the primary winding of the transformer $T_2'$, makes it possible to provide a feedback loop gain of approximately unity, as required for conventional slicer circuits. Thus, by arranging that the suppressor swing from the cathode potential down to the zero output value, the gain of each of the tubes $V_1'$, $V_2'$ may be varied from an augmented full value to zero. Because this feedback action occurs in synchronism with the elevation and reduction of the suppressor grid potentials by the action of the resonant circuit, the tubes, regarded as gates, are more effectively opened when a pulse of the incoming train is due to appear and are more effectively closed at other times.

Excessive negative swings of the suppressor grid are to be avoided, especially in the circuit of Fig. 6, to prevent restoration of the gain of any tube with reversed polarity (by action of the screen current) at the wrong part of the signal.

Returning now to Fig. 1, after the pulse train of Fig. 2 has been regenerated by any of the regenerators described above and as many times as may be desired by successive action of regenerative repeaters coupled together in tandem, it arrives at a receiver station where it is preferably reconverted to conventional binary code before decoding and reproduction. The reconversion process may be carried out as shown in Fig. 1 simply by applying the pulse train to a positive feedback amplifier 30 having a loop gain of unity and in whose feedback path there is connected a storage unit 31 proportioned to store the incoming pulse train for one pulse period and then deliver it to the amplifier input with no inversion of polarity. Buffers 33, 34 are included to insure energy transfer in the desired directions. The operation of the reconverter is inverse to that of the converter at the transmitter station. This may be seen from the following description of its operation. When the pulse train of curve B of Fig. 3 is applied to the input terminals of the reconverter and if, for purposes of explanation, it is assumed that the output of the reconverter has the form of the pulse train A, then the stored or delayed feedback signal may be represented by pulse train $A_d$. But the addition of wave $A_d$ without phase reversal to wave B results simply in wave A, as previously assumed. Hence, the assumption is confirmed and in fact the output has the wave form of curve A, i. e., a conventional binary code pulse train. Thus, when the pulse train of curve B of Fig. 3 is applied to the input terminals of the reconverter, its output is in the form of the pulse train of curve A of Fig. 3, i. e., a conventional binary code pulse train.

This may now be applied to a conventional binary decoder 32 of any desired type, for example, as described by L. A. Meacham and E. Peterson in the Bell System Technical Journal for January 1948 (vol. 27), at page 1. The decoded output may then be applied to any desired reproducer such as a loudspeaker.

Figure 10:
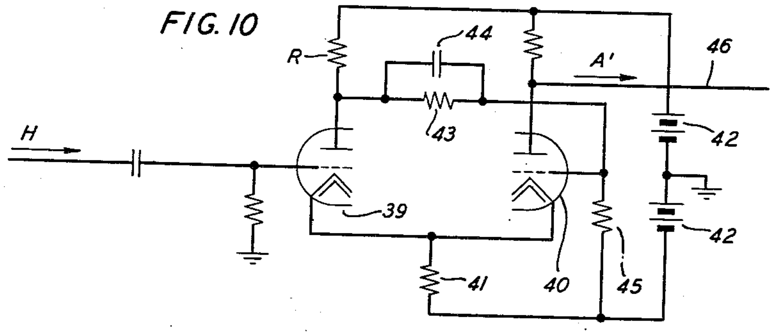
Fig. 10 shows simplified apparatus for reconverting the twinned binary code into conventional binary code pulse trains.
Figure 9:
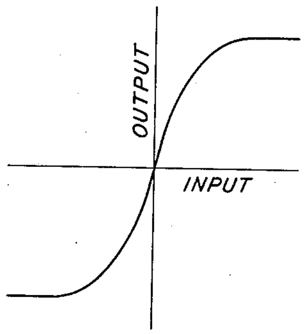
Fig. 9 is an input-output characteristic for a non-linear amplifier which may form part of the system of Fig. 1.

As a practical matter, the amplifier 33 (through which passes only the reconverted binary pulse train A) may actually have a non-linear input-output characteristic, as shown, for example, in Fig. 9, so as to perform amplitude regeneration along with the translation. In this case, the loop gain need be unity only in an average sense, being greater than this value during transitions from pulse to space or from space to pulse and less when either a pulse or a space is present. In accordance with well-known feedback theory, such a circuit tends to be unstable during transitions but has assured stability at each of the two limiting values, for which the loop gain is substantially less than unity. This reasoning may be extended a step further by noting that the non-linear feedback loop under discussion is bistable in nature and that it is common practice to use bistable devices for storage purposes. In fact, the storage function in the feedback path may actually be embodied in the inherent properties of the bistable feedback loop. Accordingly, a convenient device for carrying out the reconversion operation and one which is equivalent in its effects to the combination of the non-linear feedback amplifier with its single period storage of Fig. 1 is a bistable multivibrator as shown in Fig. 10, comprising two triodes 39, 40 having their cathodes directly connected together and by way of a coupling resistor 41 to the negative terminal of a potential source 42 whose positive terminal is connected by way of individual anode resistors to the anodes of the tubes. A coupling is provided by way of a high resistor 43 shunted by a small condenser 44 from the anode of the left-hand tube 40 to the control grid of the right-hand tube 41, which is returned by way of a high resistance 45 to the negative terminal of the source 42. The incoming twinned binary code pulse train is applied by way of a condenser and across an input resistor to the grid of the left-hand tube. The feedback ratio of the circuit and the grid bias of the right-hand tube are adjusted by proportionment of the various resistors to provide a threshold for tripping in one direction whose magnitude is approximately equal to one half the amplitude of the incoming positive pulses and a similar threshold for tripping in the opposite direction having a magnitude equal to approximately one half the amplitude of the incoming negative pulses. Such thresholds are indicated in the upper curve of Fig. 11 by broken lines. Thus, incoming pulses of less than half the amplitude of the code pulses due, for example, to noise or interference fail to affect the circuit in any way. When an incoming pulse in excess of the positive threshold, for example, the pulse H of Fig. 11, arrives and assuming that the left-hand tube 40 is in its non-conducting condition, the pulse drives the grid of the left-hand tube positive, thus forcing this tube into its conducting condition, while the right-hand tube 41 is driven by the plate-to-grid coupling into its non-conducting condition. The potential of the right-hand tube anode then rises, giving rise to a positive pulse on the output lead 46. The circuit then remains in this condition until the incoming signal has passed through its zero value, where it may remain for a prolonged sequence of Off pulses and until the next negative pulse has arrived and has exceeded the negative tripping threshold. Application of this negative pulse to the left-hand grid drives the left-hand tube into its non-conducting condition, its plate potential rises, driving the right-hand grid positive and permitting the right-hand tube to conduct. In other words, the circuit snaps from its first condition into its second condition, and the anode potential of the right-hand tube, now negative, is applied on the output lead 46. Here again, it remains until arrival of the next positive pulse in excess of the positive tripping threshold.

Figure 11:
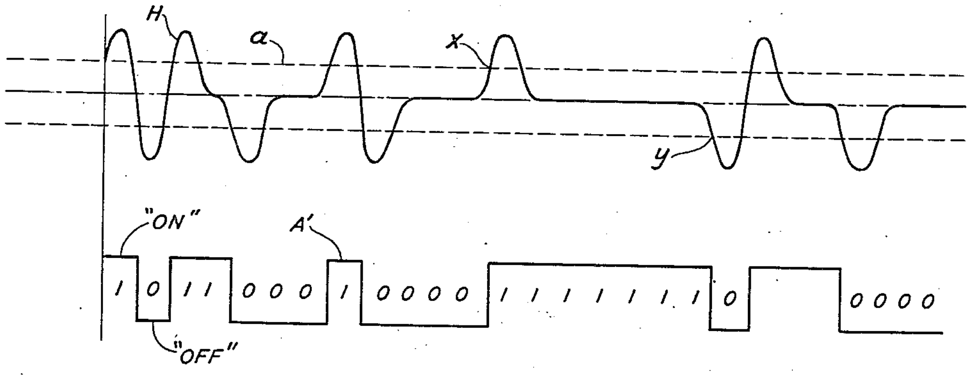
Fig. 11 is a pair of wave-form diagrams illustrating the operation of the apparatus of Fig. 10.

This action is depicted in Fig. 11, where the upper curve shows the incoming twinned binary code pulse train, and the lower curve shows the potential on the output lead of the reconverting multivibrator. It is evident that, apart from its sharp discontinuities and rectangular form, this lower curve of Fig. 11 represents the same permutation of pulses and spaces as was originally shown in the curve of Fig. 3, that is to say, the reconversion from the twinned binary code pulse train to a conventional binary code pulse train is complete.

Modifications of the various circuit elements described above and shown in the drawings will suggest themselves to those skilled in the art.

What is claimed is:

1. Communication apparatus which comprises, at a transmitter station, means for converting a message signal into a train of pulses, each of which occupies a single pulse position, means for restricting each of said pulses to one of three, and only three, different values, namely, $On^+$, $On^-$, and Off, means for preventing occupancy of adjacent pulse positions by like On pulses, means for transmitting said train to a receiver station, and, at said receiver station, means for converting said train into a conventional binary code pulse train, and means for converting the resulting binary code pulse train into a message signal.

2. Apparatus as defined in claim 1 wherein the first-named means comprise means for first converting the message signal into a binary code pulse train, means for delaying said train by a single pulse period, and means for subtracting said delayed train from the original train.

3. Apparatus as defined in claim 1 wherein the means for converting the transmitted pulse train into a conventional binary code pulse train comprises an amplifier having an input and an output, a feedback path from the output to the input, said feedback path including a delay device for delaying energy passing therethrough by a single pulse period, and connections for applying the incoming train to the amplifier input.

4. Apparatus as defined in claim 1 wherein the means for converting the transmitted pulse train into a conventional binary code pulse train comprises a non-linear device having an input terminal, an output terminal, and two stable conditions, a first threshold for tripping it from the first condition to the second condition, and a second threshold for tripping it from the second condition to the first condition, and means for applying the incoming pulse train to said input terminal at a level such that $On^+$ and $On^-$ pulses exceed said two thresholds, respectively, while Off pulses lie between them, whereby a train of binary code pulses appears at said output terminal.

5. Apparatus for converting a three-valued train of $On^+$, $On^-$, and Off pulses in which no two adjacent pulse positions are occupied by like On pulses into a train of conventional binary code pulses which comprises a device having input terminals and output terminals, means including said device for generating the sum of two electrical quantities applied to said input terminals, connections for applying each pulse of said three-valued train as one of said quantities to said input terminals, means for storing said generated sum, means for making said stored sum available after a single pulse period, and means for thereupon applying said stored sum to said input terminals as the other of said two quantities, whereby the sum of said first sum and of the following pulse of the incoming train is generated.

6. Communication apparatus which comprises, at a transmitter station, means for converting a message signal into a train of pulses, each of which occupies a single pulse position, means for restricting each of said pulses to one of three, and only three, different values, namely, On+, On−, and Off, means for preventing occupancy of adjacent pulse positions by like On pulses, means for transmitting said train to a receiver station, said means including a push-pull regenerative repeater, and, at said receiver station, means for converting said train into a conventional binary code pulse train, and means for converting the resulting binary code pulse train into a message signal.

7. Apparatus as defined in claim 6 wherein said regenerative repeater comprises a pair of discharge devices each having a cathode, an anode, and at least one grid, said cathodes being connected together, a push-pull output circuit interconnecting said anodes, a push-pull input circuit interconnecting a grid of one device wih a similarly disposed grid of the other device, said input circuit having a center tap, a low-loss resonant circuit interconnecting similarly disposed grids of said devices with said center tap, and means for applying said train of pulses to said input circuit.

8. Apparatus as defined in claim 7 wherein the resonant circuit comprises a parallel combination of an inductance element and a capacitance element.

9. In combination with apparatus as defined in claim 8, a self-biasing resistor shunting at least a part of said capacitance element and connected to the cathodes of the discharge devices.

10. Apparatus as defined in claim 7 wherein each discharge device has a control grid and a suppressor grid, the push-pull input circuit interconnecting the control grids, the center tap being connected by way of the resonant circuit to the suppressor grids.

11. In combination with apparatus as defined in claim 10, a self-biasing resistor interconnecting the center tap of the input circuit with the cathodes of the discharge devices.

12. In combination with apparatus as defined in claim 10 wherein each discharge device has a screen grid, a positive feedback connection from the screen grid of each device to the anode of the other device.

13. Apparatus as defined in claim 6 wherein said regenerative repeater comprises a pair of discharge devices each having a cathode, an anode, and at least one control electrode, said cathodes being connected together, a push-pull output circuit interconnecting said anodes, a push-pull input circuit interconnecting a control electrode of one device with a similarly disposed control electrode of the other device, a resonant circuit tuned to the basic pulse repetition frequency of said pulse train, means for applying the pulses of said train to maintain said circuit in a state of oscillation at said frequency, and means including said resonant circuit for alternately enabling and disabling said two devices simultaneously.

14. In the art of transmitting information by way of a three-valued train of On+, On− and Off pulses in which no two adjacent pulse positions are occupied by like On pulses and in which a two-sided amplifier having push-pull input connections and push-pull output connections is employed as a repeater, the method of regenerating said pulses which comprises deriving energy of the basic pulse repetition frequency from said pulse train, utilizing said energy to maintain resonant oscillatory energy at said frequency, and applying said maintained energy to alternately enable and disable the two sides of said amplifier simultaneously.

15. A repeater for regenerating the amplitudes and timing of a three-valued train of pulses which comprises a pair of discharge devices each having a cathode, an anode, and at least one grid, said cathodes being connected together, a push-pull input circuit interconnecting a grid of one device with a similarly disposed grid of the other device, said input circuit having a center tap, a low-loss resonant circuit having a first end terminal connected to two similarly disposed grids of said devices and a second end terminal connected to said center tap, said resonant circuit comprising a parallel combination of an inductance element and a capacitance element, a self-biasing resistor shunting at least a portion of said capacitance element and connected to said cathodes, and means for applying a train of pulses to said input circuit.

16. Apparatus for regenerating the amplitudes and timing of a three-valued train of pulses which comprises a pair of discharge devices each having at least a cathode, an anode, a control grid and a suppressor grid, said cathodes being connected together, a push-pull input circuit interconnecting the control grids of said devices, said suppressor grids being connected together and to a common point, said input circuit having a center tap, a low-loss resonant circuit having a first end terminal connected to said common point, and a second end terminal connected to said center tap, and means for applying a train of pulses to said input circuit.

17. In combination with apparatus as defined in claim 16, a self-biasing resistor interconnecting the center tap of the input circuit with the cathodes of the discharge devices.

18. In combination with apparatus as defined in claim 16 wherein each discharge device has a screen grid, a positive feedback connection from the screen grid of each device to the anode of the other device.

19. Apparatus for regenerating the amplitudes and timing of a three-valued train of pulses which comprises a pair of discharge devices, each having at least a cathode, an anode, a first grid and a second grid, said cathodes being connected together, a push-pull input circuit interconnecting the first grids of said devices, means for applying a train of pulses to said input circuit and, by way of said input circuit, to said first grids in phase opposition, thereby driving them positively with respect to said cathodes in alternation, means for deriving from each positive swing of each said first grid beyond its conduction threshold a local negative current pulse, means for converting said local current pulses into voltage oscillations, and means for applying said voltage oscillations to said second grids in phase coincidence, thereby to restrict the conductivity of each of said discharge devices to a brief interval in each pulse cycle.

20. Apparatus as defined in claim 19 wherein said voltage oscillation-deriving means comprises a center tap connected to the mid-point of said input circuit, and a low-loss resonant circuit having a first end terminal connected to both of said second grids and a second end terminal connected to said center tap.

References Cited in the file of this patent

UNITED STATES PATENTS

| | | |
|---|---|---|
| 2,234,687 | Budenbom | Mar. 11, 1941 |
| 2,437,707 | Pierce | Mar. 16, 1948 |
| 2,533,802 | Hings | Dec. 12, 1950 |
| 2,538,266 | Pierce | Jan. 16, 1951 |
| 2,540,817 | Forster | Feb. 6, 1951 |
| 2,592,061 | Oxford | Apr. 8, 1952 |